E. P. BAUGH.
Making Superphosphate of Lime.
No. 47,610.  Patented May 9, 1865.
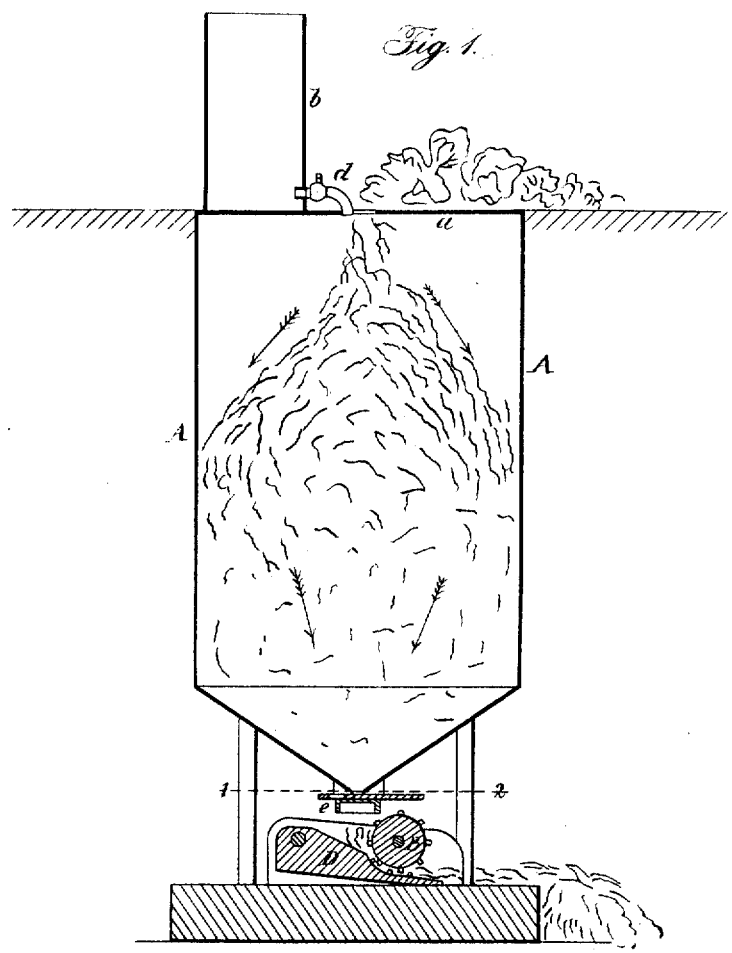
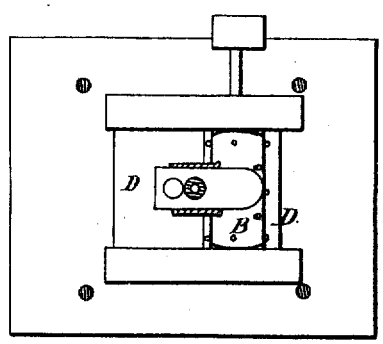
Witnesses:
Wm Albert Steel.
Chas B. Price
Inventor:
E. P. Baugh
by his Attorney
Henry Howson

UNITED STATES PATENT OFFICE.

EDWIN P. BAUGH, OF PHILADELPHIA, PENNSYLVANIA.

IMPROVED MODE OF MANUFACTURING SUPERPHOSPHATE OF LIME.

Specification forming part of Letters Patent No. 47,610, dated May 9, 1865.

*To all whom it may concern:*

Be it known that I, EDWIN P. BAUGH, of Philadelphia, Pennsylvania, have invented an Improved Mode of Manufacturing Superphosphates of Lime; and I do hereby declare the following to be a full, clear, and exact description of the same, reference being had to the accompanying drawing, and to the letters of reference marked thereon.

My invention consists in converting bones and other animal offal into superphosphate of lime by thoroughly mixing the same with sulphuric acid in a closed or nearly closed vessel or tank, substantially in the manner described hereinafter, so that the process may be conducted rapidly and without interruption.

My invention further consists in combining the said vessel or tank with a spiked roller and concave or other equivalent mechanism, by which the superphosphate as it leaves the vessel may be thoroughly disintegrated and ready for use.

In order to enable others to prosecute my invention, I will now proceed to describe the manner of carrying it into effect.

It will be proper in the first instance to explain the usual process of treating bones and other animal offal, guano, &c., for converting it into soluble superphosphate of lime. The common process is to place bones, offal, or guano on a floor, and to mix it with sulphuric acid in the same manner as ordinary mortar is mixed, and in some cases the operation is conducted in open shallow vats. There are several objections to these modes of manufacturing superphosphates. First, the gases which are generated during the process, and which would perform an important duty in assisting to render the matter soluble are permitted to escape; second, the greater portion of the heat given out by the action of the sulphuric acid escapes, and its utility as an assistant in the process lost; third, the process demands tedious and expensive manipulation; fourth, the superphosphate manufactured by the old processes is imperfect, subsequent drying and other treatment being in most cases required.

In the accompanying drawing I have illustrated apparatus by which my process may be conducted, a process by which the above difficulties are obviated.

A is a tank or reservoir, which I prefer to make of two thicknesses of wood with clay intervening, the vessel being of sufficient dimensions to contain about ten tons of the material. In the top of the vessel, which is on a level with an upper floor, is a central opening, $a$, and on one side of the latter is a leaden vessel, $b$, containing a supply of sulphuric acid, a spigot, $d$, attached to the vessel being so situated as to permit the acid to flow into the central opening of the tank. The lower end of the vat is of the tapering form represented, and terminates in an orifice, $e$, above which is a sliding door or damper, and beneath the vessel, on the lower floor, is a spiked roller, B, which is caused to revolve in the direction of the arrow in close contiguity to a spiked concave, D.

The material is conveyed along the upper floor by wheelbarrows or suitable machinery to the central opening, $a$, through which it is shoveled by an attendant into the tank. At the same time a small stream of sulphuric acid is permitted to flow with the material into the opening $a$. Both the bones or other offal and acid, as they pass into the tank, will take the direction pointed out by the upper arrows, the mass of material assuming the conical form illustrated.

As the material passes toward the exit-opening of the tank it will take the direction pointed out by the lower arrows. A thorough mixture is thus effected, and the bones or other offal are converted into superphosphates before they leave the tank. Falling in coagulated masses onto the concave D, the superphosphate is thoroughly disintegrated by the revolving spiked roller, and is in a proper condition for immediate use.

It will be evident that independent of the thorough admixture of the acid with the offal, and the consequent conversion of the same into a soluble superphosphate, but little of the gases and heat can escape. At the same time the process is continuous and rapid, and one requiring no tedious manipulation.

Although I have illustrated a mode of carrying out my invention which I have found successful in practice, it will be evident that admixture of the offal and acid may be effected by modified apparatus differing in many respects from that described.

I claim as my invention and desire to secure by Letters Patent—

1. Converting bones and other offal and guano into superphosphate of lime by causing the same to be thoroughly mixed with acid in a closed or nearly closed tank, substantially in the manner described.

2. The combination of the spiked roller and concave or other equivalent disintegrating mechanism with the said tank.

In testimony whereof I have signed my name to this specification in the presence of two subscribing witnesses.

EDWIN P. BAUGH.

Witnesses:
 CHARLES E. FOSTER,
 JOHN WHITE.